United States Patent [19]

Grzeskowiak, Jr. et al.

[11] Patent Number: 4,600,522

[45] Date of Patent: Jul. 15, 1986

[54] DETERGENT CLEANING COMPOSITION

[75] Inventors: John A. Grzeskowiak, Jr., Tottenville, N.Y.; Elliott E. Hershkowitz, Fair Lawn Township, Bergen County, N.J.

[73] Assignee: AT&T Technologies, Inc., Berkeley Heights, N.J.

[21] Appl. No.: 371,625

[22] Filed: Apr. 26, 1982

Related U.S. Application Data

[63] Continuation of Ser. No. 341,439, Jan. 22, 1982, abandoned.

[51] Int. Cl.[4] .......................... B08B 3/08; C09D 9/00; C11D 7/50; C23G 5/02

[52] U.S. Cl. ...................................... 252/170; 252/38; 252/158; 252/163; 252/174.25; 134/38; 134/40

[58] Field of Search ......... 252/158, 170, 163, DIG. 8, 252/DIG. 14, 174.25; 134/38, 40

[56] References Cited

U.S. PATENT DOCUMENTS

| | | | |
|---|---|---|---|
| 1,381,485 | 6/1921 | Mains | 134/38 |
| 1,483,587 | 2/1924 | Mains | 134/38 |
| 1,820,395 | 8/1929 | Lovell et al. | 134/20 |
| 1,936,682 | 12/1930 | Lovell et al. | 134/20 |
| 2,334,405 | 2/1942 | George | 101/149.2 |
| 3,335,092 | 8/1967 | Perry | 252/158 |
| 3,553,144 | 1/1971 | Murphy | 252/158 |
| 3,576,751 | 4/1971 | Noznick | 252/158 X |
| 3,847,839 | 11/1974 | Murphy et al. | 252/544 |
| 3,909,461 | 9/1975 | Culmone | 252/163 X |
| 4,042,524 | 8/1977 | Nychka et al. | 252/69 |
| 4,137,044 | 1/1979 | Flower | 252/8.9 X |
| 4,366,002 | 12/1982 | Carandang | 252/170 X |

OTHER PUBLICATIONS

McCutcheon's Functional Materials 1980 Annual.

*Primary Examiner*—John E. Kittle
*Assistant Examiner*—Mukund J. Shah
*Attorney, Agent, or Firm*—J. F. Spivak

[57] ABSTRACT

A detergent cleaning composition which includes a combination of a furan type alcohol, a substance having an aroma, a non-ionic surfactant and an emulsifier. The cleaner is biodegradable, meets environmental and health standards and is an effective cleaner of graffiti and other filth from the surface of anodized aluminum, stainless steel and glass.

11 Claims, No Drawings

DETERGENT CLEANING COMPOSITION

This is a continuation of application Ser. No. 341,439 filed Jan. 22, 1982 abandoned.

TECHNICAL FIELD

This invention relates to a detergent cleaning composition.

BACKGROUND OF THE INVENTION

Graffiti on public structures, such as walls, telephone booths, windows, monuments, etc., is a significant problem. It particularly represents a problem to those responsible for removing the unwanted paint and markings from the structures while still maintaining the integrity of the base materials.

The selection of a cleaning composition for widespread use must take into consideration not only whether the product effectively cleans in a reasonable amount of time without attacking the structure, but whether the composition meets health and environmental standards set by state and federal governments. Some of the most effective cleaning compositions, such as ketones, chlorinated hydrocarbons, petroleum solvents, caustics, nitropropanes and acids cannot be used because of the restrictions imposed by these standards.

SUMMARY OF THE INVENTION

The present invention is based upon the discovery that a cleaning composition adequate to clean paint and other filth without harming the surface of the object to be cleaned and which is biodegradable and meets environmental and health standards is obtained by mixing a furan type alcohol in combination with a substance having an aroma, a non-ionic surfactant and an emulsifier.

DETAILED DESCRIPTION

The present invention is based upon the discovery of a unique non-corrosive, non-toxic biodegradable and highly efficient cleaning composition. The cleaning composition is safe to use on anodized aluminum, stainless steel, glass, polycarbonates and rigid and plasticized polyvinyl chlorides to remove paint, varnish, lipstick, oil and other sources of graffiti. The cleaning composition made in accordance with the invention comprises at least one furan type alcohol, a substance having an aroma, a non-ionic surfactant and an emulsifier.

Furans are characterized by a ring structure, generally represented as:

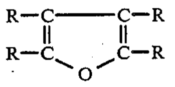

From a chemical standpoint, the parent is furan ($C_4H_4O$) wherein each R is hydrogen. The term furan type alcohol means an alcohol comprising the furan ring structure wherein at least one R is a hydroxyl or hydroxyl containing group. Examples of suitable alcohols so formed are furfuryl alcohol and tetrahydrofurfuryl alcohol.

In a preferred embodiment of the invention the furan alcohol is a mixture of furfuryl alcohol and tetrahydrofurfuryl alcohol in a weight ratio of approximately 2:1.

The substance having the aroma is typically a pine oil or a tall oil since each also have a degreasing capability.

In the preferred embodiment of the invention, a naturally derived pine oil, which is available from Union Camp Corp. (Jacksonville, Fla.), and which comprises a mixture of about 90 percent terpene alcohols and about 10 percent terpene hydrocarbons having a molecular formula of $C_{10}H_{18}O$ and $C_{10}H_{16}$, respectively, is used. The pine oil, in addition to its grease cutting capability, serves to pleasantly mask the unpleasant odor of the furan type alcohols.

The non-ionic surfactant of this solution acts as a wetting agent serving to float the greasy layer so that the surface of the object can be more effectively cleaned. Suitable surfactants comprise any primary alcohol having from 10 to 18 carbon atoms condensed with 1 to 6 moles ethylene oxide to form a primary alcohol having an ethylene oxide adduct, sometimes referred to as a primary alcohol ethoxylate. Preferably the non-ionic surfactant comprises a mixture of $C_{12}$ and $C_{14}$ primary alcohols having 4 mole and 5 mole ethylene oxide adducts, respectively.

The emulsifier is added to prevent redeposition of pigments and oils. A mixture of anionic and non-ionic surfactants is a preferred emulsifier, such as a mixture of sulfonates and nonylphenyl, ethoxylates, respectively. Preferably the emulsifier also has a passivating function. A preferred emulsifier comprising a mixture of anionic and non-ionic surfactants and a passivator is the emulsifier provided by Witco Chemical Corp. (Houston, Tex.), under the name "Witcomul H 50A".

Preferably, the resultant mixture comprises about 20 to 90 weight parts furan type alcohol, 5 to 15 weight parts odor masking and degreasing substance, 5 to 15 weight parts non-ionic surfactant and 5 to 8 weight parts emulsifier.

Additionally, the mixture can contain an agent to convert the liquid to a gel so that the cleaner can be easily and efficiently used on vertical and overhead surfaces without running or dripping. The preferred gelling agent is a fumed silica added in the amount of 5–10 weight parts depending on the preparation technique. Generally, the silica is dusted in until a gel having a yield point of about 2500 dynes/cm$^2$ and a viscosity of about 65 centipoise under shear (1711 sec$^{-1}$) at ambient temperature is obtained.

In the preferred embodiment of the invention the cleaning composition comprises 50.1 weight percent furfuryl alcohol, 23.5 weight percent tetrahydrofurfuryl alcohol, 10.3 weight percent pine oil, 10.5 weight percent mixture of $C_{12}$ and $C_{14}$ primary alcohol ethoxylate surfactant, 5.6 weight percent Witcomul H 50A emulsifier and sufficient fumed silica to cause the liquid to gel.

The resulting mixture is a highly effective cleaner additionally having the advantages of being biodegradable and of meeting environmental and health standards. The mixture in solution or gel form can be used by anyone taking only limited safety precautions.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A non-toxic, non-corrosive, caustic-free cleaning composition comprising:

(a) 20–90 weight parts of a mixture of furfuryl alcohol and tetrahydrofurfuryl alcohol;

(b) 5-15 weight parts of an odor masking and degreasing oil;

(c) 5-15 weight parts of a surfactant of the type derived from the condensation of a 10 to 18 carbon alcohol with 1 to 6 moles ethylene oxide; and (d) 5-8 weight parts of an emulsifier.

2. A composition for cleaning as defined in claim 1, wherein the alcohol mixture of furfuryl alcohol and a tetrahydrofurfuryl alcohol is in about a 2:1 weight ratio respectively to each other.

3. A composition for cleaning as defined in claims 1 or 2, wherein the surfactant comprises a primary alcohol ethoxylate selected from the group consisting of a primary alcohol having from 12 to 14 carbon atoms condensed with 4 to 5 moles ethylene oxide.

4. A composition for cleaning as defined in claims 1 or 2, wherein the emulsifier comprises a surfactant selected from the group consisting of an anionic surfactant, a nonionic surfactant and a mixture thereof.

5. A composition for cleaning as defined in claim 1, further comprising a gelling agent.

6. A composition for cleaning as defined in claim 5, wherein the gelling agent is a fumed silica added in an amount sufficient to produce a gel.

7. A composition for cleaning as defined in claim 1, wherein said surfactant is derived from a primary alcohol and said emulsifier is a mixture of a sulfonate surfactant and a nonylphenyl ethoxylate.

8. A non-toxic, non-corrosive, caustic-free composition for cleaning comprising:

(a) 20-90 weight parts of a mixture of furfuryl alcohol and tetrahydrofurfuryl alcohol in about a 2:1 weight ratio to each other;

(b) 5 to 15 weight parts of a surfactant comprising a primary alcohol ethoxylate derived from condensing a 12 to 14 carbon primary alcohol with from 4 to 5 moles ethylene oxide;

(c) pine oil; and (d) an emulsifier comprising a surfactant mixture comprising a sulfonate and a nonylphenyl ethoxylate.

9. A composition for cleaning as defined in claim 8, wherein the alcohol ethoxylate comprises a 12 carbon primary alcohol having a 4 mole ethylene oxide adduct and a 14 carbon primary alcohol having a 5 mole ethylene oxide adduct.

10. A composition for cleaning as defined in claim 8, further comprising fumed silica in an amount sufficient to form a gel.

11. The composition for cleaning as recited in claim 4, wherein the emulsifier is a mixture of a sulfonate and a nonylphenol ethoxylate.

* * * * *